United States Patent [19]

Smatko

[11] 4,052,540

[45] Oct. 4, 1977

[54] SUBSTANTIALLY NON-GASSING ALKALI RESISTANT BATTERY SEPARATOR AND METHOD OF PRODUCING SAME

[75] Inventor: Joseph S. Smatko, Santa Barbara, Calif.

[73] Assignee: McDonnell Douglas Corporation, Long Beach, Calif.

[21] Appl. No.: 89,865

[22] Filed: Nov. 16, 1970

[51] Int. Cl.² .............................................. H01M 2/16
[52] U.S. Cl. .................................. 429/229; 429/247; 429/249; 429/252
[58] Field of Search .................... 136/6, 20, 146, 148; 106/52, 58

[56] References Cited

U.S. PATENT DOCUMENTS

| 3,169,072 | 2/1965 | Hummel | 106/58 |
|---|---|---|---|
| 3,446,668 | 5/1969 | Arrance et al. | 136/6 |

OTHER PUBLICATIONS

Phase Diagrams for Ceramists, 1969, p. 145.

*Primary Examiner*—John H. Mack
*Assistant Examiner*—H. A. Feeley
*Attorney, Agent, or Firm*—Max Geldin

[57] ABSTRACT

Production of inorganic porous sintered battery separator substantially eliminating formation of gas when in contact with a zinc electrode, and permitting long cycle life of a high energy density battery such as a silver-zinc battery, produced according to one embodiment by initially firing a mixture of magnesium-bearing material, e.g., MgO, zinc-bearing material, e.g., ZnO, and silica ($SiO_2$), at temperature in the range of about 1,100 to about 1,500° C, to produce a magnesium silicate-zinc silicate composition, granulating and compacting said composition into plaques, and sintering said compacted plaques at temperature ranging from about 1,000° to about 1,300° C, to produce porous sintered separator members, in the form of a sintered solid solution of magnesium silicate and zinc silicate, having good transverse strength and low resistivity.

8 Claims, 1 Drawing Figure

Figure 1:
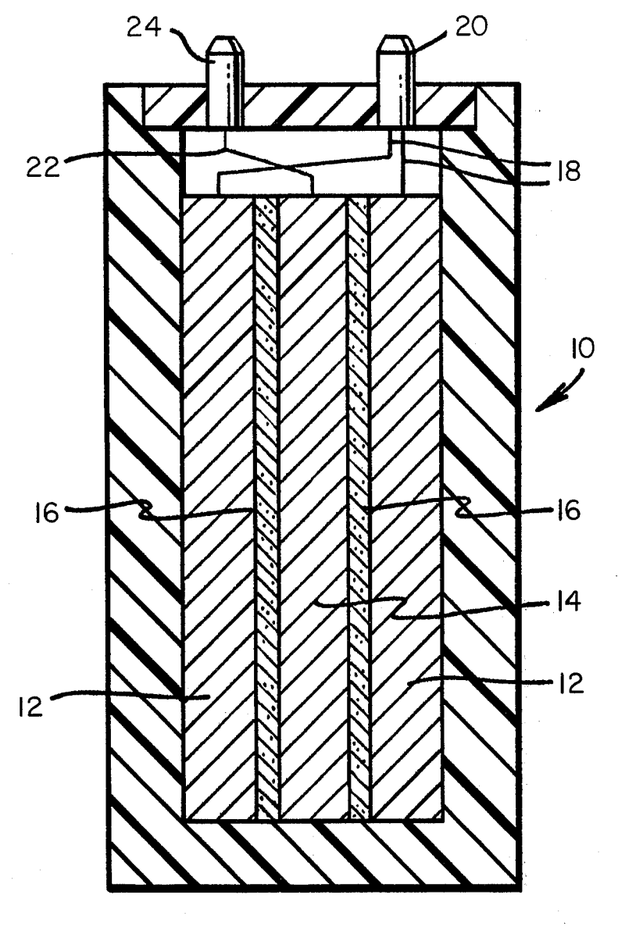

SUBSTANTIALLY NON-GASSING ALKALI RESISTANT BATTERY SEPARATOR AND METHOD OF PRODUCING SAME

This invention relates to batteries, particularly high energy density batteries and is especially concerned with the production of improved inorganic members or separators for use in such batteries, especially a high energy density battery containing a zinc electrode, such separators being substantially free from any tendency to cause gassing when in contact with a zinc electrode, thereby permitting production of hermetically sealed batteries of this type having extended life, which can operate as a secondary battery over a large number of charge-discharge cycles efficiently; with novel procedure for producing such separators; and with improved battery constructions embodying such improved separators.

Batteries are an important source of energy storage for power generation. An important type of battery particularly suited for such applications are the high energy density alkaline electrolyte cells such as the silver-zinc, zinc-air and nickel-zinc batteries. High energy density batteries are generally battery systems which have a substantially higher energy per unit of weight than conventional, e.g. lead, storage batteries. In addition to important airborne applications, such high energy density batteries have many other applications such as in portable tools and applicances, television, radio and record players, engine starting, portable x-ray units and the like.

In high energy density batteries such as silver-zinc and nickel-zinc batteries, the electrodes are placed adjacent opposite sides of a membrane or separator which performs the function of retaining electrolyte, separating the electrodes, and permitting transfer of electrolyte ions while inhibiting migration of electrode ions. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperatures.

One form of particularly useful inorganic separator for such high energy density batteries, such as silver-zinc batteries is disclosed in U.S. Pat. No. 3,446,668. Such inorganic separator is in the form of a sintered porous member composed fo magnesium silicate and iron silicate. According to the patent, such separators in addition to being formed from synthetic mixtures of iron-bearing material, magnesium-bearing material, and silica, can be formed from the naturally occurring mineral olivine, a magnesium-iron silicate.

Although the magnesium silicate-iron silicate separator of the above patent has proved successful in high energy density batteries, including silver-zinc batteries and have long cycle life when operating on relatively shallow depths of discharge, e.g., of the order of about 20% depth of discharge, and when such batteries or cells are vented, it has been found experience that cells incorporating such separators and containing a zinc electrode, eventually develop gas. Thus, when non-vented or sealed cells such as a sealed silver-zinc battery containing the above noted magnesium silicate-iron silicate separator is cycled, such batteries eventually develop gas, although such cells can be cycled from about 12 to about 80 cycles on shallow cycling regimes without excessive pressure rise. However, thereafter such cells gas significantly during overcharge, and on standing, and in due course of time the pressure rise is sufficiently great to present the danger of rupture of the sealed battery case. Analysis of the gas generated in such batteries shows the major component to be hydrogen.

Tests have been devised to determine the gassing potential of the various cell components. One such test is based on mixing a predetermined weight of test material, such as particulate sintered magnesium silicate-iron silicate separator material produced according to the above patent, with a preestablished amount of zinc powder, compressing the mixture and then exposing the compressed pellet to about 30% KOH solution. The gas produced is collected and measured over a certain time period, the amount of gas collected providing a measure of the degree of activity toward gassing of the above noted separator material in contact with the zinc. This test showed that the magnesium silicate-iron silicate separator material of the above patent is very prone to cause gassing when in contact with zinc.

The above patent also discloses an inorganic separator in the form of a sintered porous member composed of a solid solution of magnesium silicate and zinc silicate. Although such separator is substantially less gassing when employed with a zinc electrode in a battery, as compared to the above noted magnesium silicate-iron silicate separator of such patent, such magnesium silicate-zinc silicate separator when employed in a high energy density battery containing alkali electrolyte, has shorter cycle life as compared to the magnesium silicate-iron silicate separator of the patent, because of the large amount of zinc generally present in such separators, and after a period of cycling, such zinc commences to dissolve in the alkali, weakening the separator and causing deterioration thereof.

Thus, the patent discloses that the magnesium silicate-zinc silicate separator thereof should contain not more than 40 mol percent magnesium silicate and hence contains 60 mol percent or more zinc silicate, since if more than about 40 mol per cent magnesium silicate is present, the result is the presence of two phases, which is undesirable. However, since it is the magnesium silicate which provides high alkali resistance and the large amount of zinc silicate therein tends to reduce alkali resistance, particularly at elevated temperatures, it would be particularly desirable to substantially increase the magnesium silicate content of such separator and substantially reduce the zinc silicate content thereof, while still maintaining the composition in the form of a single phase solid solution.

In accordance with the present invention, it has been found unexpectedly that this can be achieved and that porous members or membranes in the form of a single phase sintered magnesium silicate-zinc silicate composition, can be provided having substantially higher alkali resistance at ambient and at elevated temperature of the order of 100° C or higher, and substantially longer cycle life in a high energy density battery using a rigorous cycling regime, e.g., cycling at 50% or lower depth of discharge, than the magnesium silicate-zinc silicate separators of the above patent, if the magnesium silicate-zinc silicate separators produced contain not less than about 60 mol percent magnesium silicate and not more than about 40 mol per cent zinc silicate. In addition to the above noted advantages the resulting separators still retain their important characteristic of being substantially non-gassing when in contact with a zinc electrode in a battery, and hence overcome the disadvantages of the above noted magnesium silicate-zinc silicate separators of the above patent, while at the same time affording a high energy density battery containing a zinc electrode, which has a long cycle life, yet which can be hermetically sealed.

In view of the teachings of the above patent, it was indeed surprising to find, as confirmed by x-ray diffraction studies, that the magnesium silicate-zinc silicate separators of the present invention having the high magnesium silicate content in excess of about 60 mol percent and correspondingly relatively low zinc silicate content of not more than about 40 mol percent, are essentially single phase refractory structures, believed to be in the form of a solid solution. The high resistance to alkali and to deterioration in alkali of the invention separators is evidenced by their ability to withstand cycling in a high energy density silver-zinc battery for a period in excess of 1,000 charge-discharge cycles employing a rigorous cycling regime without signs of dissolving in the alkali electrolyte while producing substantially no gas and with good electrical efficiency.

Briefly, the improved substantially non-gassing magnesium silicate-zinc silicate separator when employed with a zinc electrode, according to the invention, and which has good resistance to alkali, good strength and low resistivity, is produced by sintering at temperature ranging from about 1,000° to about 1,3000° C, a compacted magnesium silicate-zinc silicate composition having proportions of magnesium silicate and zinc silicate within the proportions noted above, and corresponding to proportions of the magnesium, zinc and silica-bearing starting components calculated as oxides, set forth below.

The magnesium silicate-zinc silicate composition of the invention is generally produced from a synthetic starting mixture of the magnesium-bearing, zinc-bearing and silica-bearing materials.

Hence, in the general practice for carrying out the invention for obtaining the improved alkali resistant essentially non-gassing magnesium silicate-zinc silicate separator hereof, a synthetic mixture of suitable magnesium-bearing, zinc-bearing and $SiO_2$-bearing materials are mixed generally in proportions of about 27 to about 57%, preferably about 37 to about 53%, magnesium or magnesium-bearing material or compound calculated as MgO, about 1 to about 38%, preferably about 5 to about 25%, zinc or zinc-bearing material or compound calculated as ZnO, and about 34 to about 43%, preferably about 37 to about 42% silica ($SiO_2$), by weight. It will be understood that the proportions of components employed can be varied within the above ranges to obtain the desired separator structure in terms of alkali resistance, strength or modulus, and porosity.

Suitable magnesium-bearing materials or magnesium compounds which can be employed are, for example, magnesium carbonate, magnesium sulfate, magnesium nitrate, magnesium chloride, magnesium silicate, magnesium oxide and hydroxide, and the naturally occurring minerals talc, Enstatite, Magnesite and Forsterite.

As sources for suitable zinc-bearing materials or zinc compounds which can be employed are included zinc oxide, zinc carbonate, or soluble zinc salts such as zinc sulfate, zinc chloride, zinc nitrate, or zinc acetate. Also, the source of zinc can be a mineral species of zinc silicate, with due compensation being made for the amount of silica, with respect to the main sources of silica noted below.

As a source of suitable $SiO_2$-bearing materials, there can be employed, for example, flint, silica, sands, diatomaceous earth, fume silica, magnesium silicate, silica gel and silicic acid.

In preferred practice for producing the substantially non-gassing separator when in contact with zinc according to the invention, the content of impurities in the form of metals such as iron, nickel and cobalt in the above noted source materials should be low since such metals when present in the final separator produce low hydrogen overvoltages when in contact with zinc. Thus, it is preferred that the source materials be substantially free of iron, nickel and cobalt, and contain very little, if any, of such metals, preferably not in excess of about 1% calculated as FeO, total of such metals by weight of the total inorganics content of the starting mixture. However, in certain instances larger amounts of such metals can be tolerated, but are not preferred.

Various methods can be employed for preparing the raw material mixtures. According to one procedure the various components, that is the magnesium compound, the zinc compound and the silica-bearing material or compound can be mixed in the above noted proportions and the mixture first ground to relatively fine particle size. Alternatively, to produce starting mixtures of small particle sizes and intimate contact of particles a precipitation reaction or procedure can be employed. In such procedure, for example, silica such as fume silica can be slurried together with an aqueous solution of a soluble magnesium compound such as magnesium nitrate, and a soluble zinc compound such as zinc nitrate, the ratios of such components being chosen to provide the correct ratios of net oxides within the ranges noted above, upon firing. With vigorous stirring, a precipitant such as ammonia or ammonium hydroxide is added to precipitate the mixed oxides or hydroxides. Filtration and washing can be conducted if desired, to remove soluble ammonium nitrate and the resulting heavy paste dried to form a crumbly mass. Where such filtration is not carried out, the mass is fired at temperature of about 400° to about 800° C to eliminate the ammonium nitrate and the major portion of the water, and the resulting mass is then granulated and powdered to produce an intimate mixture of the magnesium-bearing and zinc-bearing materials in the form of their oxides, and the silica. In the above precipitation procedure, instead of ammonia, other precipitants can be employed such as ammonium carbonate, sodium hydroxide, or sodium carbonate, and when using either of the latter two precipitants, it is necessary to wash out the sodium salts prior to subsequent firing. The final precipitated slurry or paste has the respective derived oxides, or hydroxides, or carbonates very intimately mixed and in very fine particle size, e.g., below 10 microns.

In either of the procedures noted above for producing the mixture of starting materials of fine particle size, to such mixture there can then be added a small amount, e.g., about 2 to about 10% of an organic binder, by weight, of total inorganics, such as a polyethylene glycol, e.g., Carbowax, beeswax, paraffin wax or whale wax, generally dissolved in a suitable solvent such as acetone or toluene, and the resulting mixture dried, e.g., at ambient temperature or at elevated temperature to remove solvent. Although the addition of an organic binder is not necessary, it is preferred to employ such binder in order to provide adequate "green strength" for handling the mixture.

The resulting mass is then pressed into blocks at pressures of about 2,000 to about 20,000 psi, the presence of the binder aiding in this operation. Where a binder is present, such blocks are then fired first in air at temperature of the order of about 400° to about 600° C for a period of about 15 minutes to about 4 hours, to remove the organic binder. The blocks are then fired at temperature of the order of about 1,000° C to about 1,500° C. The latter firing operation is generally carried out for a period of about 1 to about 16 hours, and such firing causes reaction of the magnesium and zinc compounds to form the magnesium silicate-zinc silicate composition.

It is preferred to carry out the latter firing operation for converting the initial starting components to the magnesium silicate-zinc silicate solid composition at the upper portion of the latter temperature range, that is at between about 1,300° to about 1,500° C in order to obtain complete reaction. Otherwise, when employing initial firing temperature ranging between about 1,100° C and below about 1,300° C, for 8 hours or less, a second reaction firing may be necessary to obtain complete reaction to yield the above noted magnesium silicate-zinc silicate composition.

As previously noted, during such firing operation at the high temperatures, the magnesium-bearing and zinc-bearing materials or compounds, are converted to the oxides and then by reaction forming with the silica component the magnesium silicate-zinc silicate having the general formula;

$$2(Mg_a\cdot Zn_b)O\cdot SiO_2.$$

The values for the $a$ and $b$ subscripts of the above formula vary depending on the relative proportions of the magnesium-bearing and zinc-bearing materials, and silica-bearing material employed.

The resulting initially fired pressed blocks, following cooling thereof, are granulated or pulverized, and ground to fine particle size, e.g., below about 5 microns, preferably although not necessarily, again mixed with fugitive organic binders of the types noted above and in the above noted amounts, and the mixture granulated, e.g., by pressing granulation, as through a screen, and the resulting powder is then pressed into blocks or plaques at pressures, e.g., ranging from about 2,000 to about 20,000 psi, and when employing such binders, are fired first at temperature of the order of about 400° to about 600° C for a period of about 15 minutes to about 4 hours, to remove the organic binder. The pressed plaques are then sintered at temperatures of the order of about 1,000° to about 1,300° C, preferably about 1,100° to about 1,250° C, for a period of from about 5 minutes to about 8 hours to form the magnesium silicate-zinc silicate composition into the desired structure, that is in the form of porous members or membranes having the required characteristics of strength, alkali resistance, and resistivity, as noted above, for use as battery separators.

As indicated by x-ray diffraction data, the resulting porous sintered separators are substantially single phase structures with no evidence of plural phases being present. These single phase compositions are believed to be in the form of a solid solution of magnesium silicate and zinc silicate having a composition ranging from about 60 to about 99 mol percent magnesium silicate and about 1 to about 40 mol percent zinc silicate, such ranges preferably being from about 75 to about 95 mol percent magnesium silicate and about 5 to about 25 mol percent zinc silicate.

As will be pointed out below, it has been found that the resulting separators not only possess the ability to markedly reduce and substantially eliminate gassing when in contact with a zinc electrode in a battery, thereby permitting hermetic sealing of the battery and affording very long cycle life, but in addition such separators have remarkably high resistance to alkali both at ambient and elevated temperature even though a substantial portion of the separator composition (up to 40 mol percent) can be zinc silicate, a species ordinarily relatively soluble in alkali. This clearly indicates that the zinc silicate is tied up in the magnesium-zinc silicate single phase solid solution, reducing the zinc content subject to alkali attack. As pointed out above, and demonstrated below, the magnesium-zinc silicate separators of this invention are much more alkali resistant and have substantially longer life in a secondary battery when cycled under rigorous cycling regime at low depths of discharge, than the magnesium-zinc silicate separators of the above patent. Further, the separators of this invention when employed in an alkaline battery which is sterilized or heat treated at temperature of the order of 135° C and higher, for up to 200 hours, has substantially greater alkali resistance and life than the magnesium-zinc silicate separators of the above patent.

The magnesium-zinc silicate separators produced according to the invention also have low resistivity which can range from about 5 to about 50 ohm-cm, providing high electrical efficiency, relatively high transverse strength or modulus of rupture ranging from about 8,000 up to about 18,000 psi, and a porosity corresponding to a water absorption ranging from about 5 to about 50%, preferably about 7 to about 25%. In addition to markedly reducing gassing when in contact with a zinc electrode, the magnesium silicate-zinc silicate separators of the invention inhibit formation of zinc dendrites when in contact with a zinc electrode in a battery, thereby further aiding in prolonging battery life. Thickness of the separators produced according to the invention generally range from about 0.005 to about 0.050 inch, but can vary outside this range.

The magnesium silicate-zinc silicate separator material produced according to the invention and converted or granulated to a ground particulate form, can be employed as inorganic separator material used in flexible separators, generally comprised of said separator material in particulate form distributed uniformly in a polymeric organic binder.

These include, for example, the flexible separators described in the copending application, Ser. No. 676,224, filed Oct. 18, 1967 of C. Berger, et al, now abandoned, and consisting, for example, of a porous inorganic material, which can be the above noted magnesium silicate-zinc silicate improved separator material of the present invention in particulate form, and a minor portion of a water coaguable organic fluorocarbon polymer such as a vinylidene fluoride polymer, to bond the particles of the inorganic material.

Also, the above noted particulate magnesium silicate-zinc silicate separator material produced according to the invention can be employed as the inorganic material in the flexible separators described in the copending application, Ser. No. 676,223, filed Oct. 18, 1967, of F. C. Arrance, now U.S. Pat. No. 3,542,596, and consisting for example of a major portion of such inorganic material, e.g., the above noted magnesium silicate-zinc silicate separator material of the invention, a minor portion of potassium titanate, and a minor portion of a cured organic polymer such as polyphenylene oxide as bonding agent.

Further, the improved inorganic separator material of the present invention in particulate form can be applied in the copending application, Ser. No. 707,808, filed Feb. 23, 1968, of F. C. Arrance, et al, abandoned in favor of continuation application Ser. No. 154,218, filed June 17, 1971, disclosing an improved flexible porous separator, which can be box-shaped to provide a compartment for a battery electrode, produced by applying on a flexible porous substrate, such as flexible sheets or mats of various materials including potassium titanate paper, asbestos, alumino-silicate sheets, and the like, a film comprising a mixture of particulate magnesium silicate-zinc silicate separator material according to the invention, and an organic polymeric bonding agent of various types, such as polyphenylene oxide, or a fluorocarbon polymer such as vinylidene fluoride polymer, bonding the particules of the inorganic material together with the bonding agent, and forming a porous substantially inorganic separator film on the flexible substrate.

Also, the particulate magnesium silicate-zinc silicate improved separator material of the invention can be employed as the inorganic material in producing the flexible microporous separator film described in copending application, Ser. No. 27,577, filed Apr. 13, 1970, by M. P. Strier and J. S. Smatko, which consists essentially of an organic polymer such as polytetrafluoroethylene, having particles of such inorganic material uniformly distributed in said film.

In addition, the particulate magnesium silicate-zinc silicate separator material of the invention can be employed for producing a flexible porous separator according to the principles of copending application, Ser. No. 829,573, filed June 2, 1969, of F. C. Arrance, et al, now U.S. Pat. No. 3,625,770, by applying a mixture of such material and an organic polymeric bonding agent such as polyphenylene oxide to a flexible fuel cell asbestos matrix, previously impregnated with polyphenylene oxide.

The following are examples illustrating practice of the invention:

EXAMPLE 1

The following mixture of components is prepared:

| Components | Wt. % | Wt./Grams |
|---|---|---|
| MgO | 48.8 | 72.6 |
| ZnO | 10.9 | 16.3 |
| SiO$_2$ (finely ground sand) | 40.3 | 60.1 |
| | 100.0 | 149.0 |

The materials are ball-milled for 24 hours in wet condition, dried, the cake broken up, the particles compressed into blocks or slugs at 5,000 to 20,000 psi, fired in air at 1,350° C for 8 hours and cooled. The blocks are then pulverized, ground in a ball-mill in acetone for 48 hours, dried to a cake, and the cake powdered and mixed with a binder comprised of equal parts of beeswax, napthalene and a synthetic wax marketed as "Voidox", in an amount of 5% by weight of total inorganics, dissolved in sufficient toluene to make a stiff, but mixable paste. The toluene is evaporated and the cooled crumbs are granulated by pressing through screens. The fraction passing a 60 mesh screen and held on a 150 mesh screen is used for pressing at 8,000 psi into separator plaques. These plaques then are fired at 500° C for ½ hour to burn off the binder, and are then fired in air at 1,220° C for 25 minutes to yield separators having a porosity corresponding to about 11–12% water absorption, and resistivity of 16 ohm-cm and modulus of rupture of 13,200 psi.

The separator plaques contain about 90 mol percent magnesium silicate and about 10 mol per cent zinc silicate.

EXAMPLE 2

The following mixture of components is prepared:

| Components | Wt. % | Wt./Grams |
|---|---|---|
| Cab-O-Sil (colloidal silica) | 35.1 | 200 |
| ZnCO$_3$ | 27.2 | 155 |
| MgO | 37.7 | 215 |
| | 100.0 | 570 |

The above mixture is dry blended for ¼ hour to provide a powdery mass, and enough water is added to make a thin paste. This mass is then mixed in a Waring Blendor for 10 minutes, then poured out into a stainless steel pan to a depth of ½ inch, and dried in an oven. The cake then is manually crushed to a coarse powder, and a solution of 20 grams paraffin wax dissolved in 300 cc hexane is added to the powder and mixed with a spatula. Additional hexane is added to make a stiff crumbly paste. After hand mixing for 5 minutes, the solvent is evaporated in a hood in the air current of a fan.

When dry, the resulting crumbs are compressed at 20,000 psi into blocks or slugs. These are fired in refractory crucibles in an electric furnace, in air, at 1,390° C for 5 hours. The cooled product is pulverized to 16 mesh.

The resulting granular material is then ball-milled 48 hours in hexane, and to the ball-milled slurry is added 21 grams (4% of total inorganics content) of paraffin dissolved in a small amount of hot toluene. The slurry is dried in a current of air in a hood while being given periodic mixing.

The dried crumbs are granulated by pressing granulation through screens, and the fraction between −60 and +150 is used to press separator plaques. Such pressing is accomplished at 10,000 psi to yield plaques, which upon firing are about 0.025 to 0.029 inch thick. Firing is carried out in air in an electric furnace. One batch, fired for 20 minutes at 1,205° C, provides plaques having a porosity corresponding to about 13% water absorption and an apparent density of 2.26 g./c.c. Another batch fired at 1,215° C for 15 minutes provides plaques having a porosity corresponding to a water absorption averaging 11%, and an apparent density of 2.36 g./c.c.

The separator plaques contain 80 mol percent magnesium silicate and 20 mol per cent zinc silicate.

EXAMPLE 3

The following mixture of components is prepared:

| Components | Wt. % | Wt./Grams |
|---|---|---|
| Silicic acid | 37.2 | 79.4 |
| MgO | 34.0 | 72.6 |
| Zn(NO$_3$)$_2$ · 6H$_2$O | 28.8 | 61.5 |
| | 100.0 | 213.5 |

The weighed components are mixed in a Waring Blendor with just enough water to give a consistency like heavy cream. After 2 minutes of mixing, 13 cc of C.P. ammonium hydroxide, dissolved in 15 cc water, are slowly added, with mixing continued for another 20 minutes. Small additions of water are made as needed to keep a heavy-cream consistency, the last increment of water being hot and containing 4.5 grams Carbowax 4000, a polyethylene glycol wax. The slurry is then cast in a stainless steel pan and air dried in a hood.

The dried cake is broken by hand into small lumps which are pressed into blocks at 12,000 psi. These are fired in crucibles in an electric furnace with a ½ hour dwell time at 600° C to drive off volatiles before terminal firing at 1,340° C for 6 hours. The cooled ceramic-like blocks are pulverized, ball-milled in acetone for 16 hours and repressed into blocks as before, using 4.5 grams Carbowax as binder. Refiring is done again as before. After pulverizing, the material is ball-milled in acetone for 48 hours, followed by filtration of the slurry to obtain a damp filter cake which is mixed with 9 grams (6% by weight of total inorganics) Carbowax 4000 dissolved in 20 cc hot acetone. Mixing is continued in an air draft to yield a mass of crumbs. These crumbs are granulated by pressing granulation through screens, the fraction +150 mesh, −60 mesh then being pressed into thin wafers.

These wafers are fired at 1,200° C for 15 minutes to yeild separators ranging in thickness from 0.025 to 0.030 inch, averaging 10% water absorption, apparent density of 2.47 g/cc, resisitivity in 30% KOH of 18 ohm-cm, and modulus of rupture of 15,400 psi. The resulting separators contain about 90 mol percent magnesium silicate and about 10 mol percent zinc silicate.

X-ray powder diffraction of these separators show essentially a single phase, essentially solid solution, structure with no evidence of free $SiO_2$, MgO, ZnO or other phases. The zinc pellet gassing test of this material (see Example 8 below) shows only 3.5 cc of gas liberated in 48 hours, comparable to that of a zinc blank.

EXAMPLE 4

The following mixture of components is prepared:

| Components | Wt. % | Wt./Grams |
|---|---|---|
| Magnesium Trisilicate | 61.5 | 200 |
| Zinc Carbonate | 6.5 | 21.4 |
| Magnesium Hydroxide | 32.0 | 104 |
| | 100.0 | 325.4 |

The components are mixed and processed as in Example 3 except that the initial or reaction firing of the raw mixture is done at 1,410° C for 8 hours, and after regrinding and reblocking, the firing is repeated at 1,410° C for 8 hours.

The separator pressing grnulation is fired at 1,220° C for 25 minutes to yield separators averaging 13.5% porosity, apparent density of 2.18 g./cc and modulus of rupture of 12,000 psi. These separators contain 95 mol percent magnesium silicate and 5 mol percent zinc silicate.

EXAMPLE 5

The following mixture of components is prepared:

| Components | Wt. % | Wt./Grams |
|---|---|---|
| $Zn_2SiO_4$ (Willemite) | 29.5 | 84 |
| Cab-O-sil (colloidal silica) | 18.6 | 53 |
| $MgCO_3$ (Magnesite) | 51.9 | 148 |
| | 100.0 | 285 |

The Willemite and Magnesite are separately finely ground in a ball mill in water for 48 hours to provide the stock material for compounding. The mixing and firing are carried out as in Example 2, except that the initial or reaction firing is done at 1,360° C for 6 hours. The separator granulation is then fired at 1,215° C for 13 minutes, yielding separators having average porosity corresponding to water absorption of 12.4%, average apparent density of 2.27 g./cc., modulus of rupture of 12,900 psi, and containing 70 mol percent magnesium silicate and 30 mol percent zinc silicate.

EXAMPLE 6

The following mixture of components is prepared:

| Components | Wt. % | Wt./Grams |
|---|---|---|
| Cab-O-Sil | 10.3 | 96 |
| $Mg(NO_3)_2 \cdot 6H_2O$ | 79.5 | 737 |
| $Zn(NO_3)_2 \cdot 6H_2O$ | 10.2 | 95 |
| | 100.0 | 928 |

The components are added to a 3 liter beaker, and 600 cc of water are added. Stirring is commenced and the contents heated to about 60° C. To this slurry is slowly added under stirring 365 grams of ammonium carbonate monohydrate dissolved in 500 cc of water. This causes precipitation of carbonates of magnesium and zinc in finely divided form. Stirring is continued for ½ hour after the last of the precipitant is added. The material is poured into stainless steel pans and dried in an oven at 105° C.

The dried product, broken into pea-size pieces, is heated for about 4 hours at 400° C, or until all of the ammonium nitrate is removed. The cooled particles are ground to a fine powder, mixed to a heavy paste with an acetone solution of 7 grams Carbowax, corresponding to about 3% by weight of the ceramic mix, and dried. The crumbs are pressed at 8,000 psi to form blocks or slugs, which are fired in air at 1,350° C for 8 hours in an electric furnace.

The cooled slugs are ground to 16 mesh in a Bico Pulverizer and the little granules are ball-milled in acetone for 48 hours, after which the material is filtered. The wet cake is mixed with 12 grams of carbowax-4000 dissolved in 50 cc of acetone to form a thick paste, which is dried in a hood. The crumbs are granulated through screens and the fraction retained on a 150 mesh screen and passing through a 60 mesh screen comprises thepressing granulation.

Plaques are pressed from this granulation, such that the thickness of the subsequently fired plaques is 25–30 mils. Firing of the separator plaques is substantially the same as that for Example 3. The separator product approximates closely the results obtained for Example 3, in that the resulting plaques show a porosity corresponding to an average of 9.8% water absorption, average apparent density of 2.47 g/cc, modulus of rupture of 15,550 psi, and resistivity in 30% KOH of 19.6 ohm-cm. Samples of the separator kept in 30% KOH solution at 100° C for 48 hours show a weight loss of only 1.8%. the separator contains 90 mol percent magnesium silicate and 10 mol percent zinc silicate.

EXAMPLE 7

The following mixture of components is prepared:

| Components | Wt. % | Wt./Grams |
|---|---|---|
| Talc | 62.4 | 130 |
| MgO | 27.2 | 56.7 |
| ZnO | 10.4 | 21.7 |
| | 100.0 | 208.4 |

The materials are ball-milled 48 hours in hexane, filtered, and the cake dried and mixed with 10 grams of Carbowax-4000 dissolved in 80 cc hot acetone. Cool acetone is added in amount to make a thick paste which is dried in a hood. The dried crumbs are compressed into a block at 25,000 psi, and fired in a gas fired furnace at 1,390° C for 8 hours after volatilizing out the fugitive binder in an electric furnace for 1 hour at 500° C.

The cooled ceramic-like material is crushed in a Bico Grinder to about 16 mesh size. The grains are then ground in a ball mill in heptance for 60 hours, and then filtered. The wet cake is mixed with 10 grams of Carbowax-4000 (approximately 5% by weight of total inorganics, and dissolved in warm heptane to make a thick paste. The mixture is dried in a hood, and the crumbs resulting are granulated to a pressing granulation which is retained on a 150 mesh screen and passes a 60 mesh screen. Plaques are pressed at 10,000 psi from such granulation, and fired in air in an electric furnace at 1,220° C, for 14 minutes, yielding separators having a porosity corresponding to a water absorption of about 11.3%, an apparent density of 2.37 g./cc, and resistivity in 30% KOH averaging about 16.5 ohm-cm. Such separators contain about 90 mol percent magnesium silicate and about 10 mol percent zinc silicate.

EXAMPLE 8

Balsam Gap natural olivine having the composition 47–49%, MgO, 7–9% FeO and 30–41% $SiO_2$, processed into magnesium silicate-iron silicate separator material according to the procedure described in the above U.S. Pat. No. 3,446,668, by firing the Balsam Gap olivine at temperature of about 1,300° C is provided, and designated material (A). There is also provided magnesium silicate-zinc silicate separator material produced according to Example 1 of the above patent and containing just under 40 mol percent magnesium silicate and just over 60 mol percent zinc silicate, such mixture designated (B).

There is also provided the magnesium silicate-zinc silicate separator material of Example 3 above, containing 90 mol percent magnesium silicate and 10 mol percent zinc silicate, in granulated form.

The above noted mixtures of materials (A), (B) and (C) are each respectively mixed with 68.4% zinc powder by weight of the mixture, and the respective mixtures compressed at about 18,000 psi into pellets, and such pellets contacted under the same conditions with 30% KOH solution at ambient temperature. Further, a zinc blank is pelleted in the same manner and contacted with the same concentration KOH solution. The gas produced in each test is collected and measured with respect to time.

The materials tested and the amount of gas collected at various specified times from the reaction of the respective pellets contacted with the KOH solution, are set forth in the table below:

TABLE

| Test No. | Starting Material | Gas Collected (cc) | | | | |
|---|---|---|---|---|---|---|
| | | 1 hr. | 2 hrs. | 6 hrs. | 24 hrs. | 48 hrs. |
| 1 | Balsam Gap Olivine (A) - Pat. No. 3,446,668 | 66 | 108 | 220 | 431 | 559 |
| 2 | Magnesium Silicate-Zinc Silicate (B) Pat. No. 3,446,668 | 0.2 | 0.7 | 1.0 | 2.2 | 5.1 |
| 3 | Magnesium Silicate-Zinc Silicate (C) | 0.0 | 0.0 | 0.6 | 1.5 | 3.5 |
| 4 | Zinc Blank | 0.0 | 0.0 | 0.3 | 1.5 | 3.0 |

Results from the above table show greatly reduced gassing rates corresponding to substantially complete elimination of gassing for the magnesium silicate-zinc silicate material (C) of the present invention (Test 3), as compared to the Balsam Gap olivine separator material (A) produced according to the above patent (Test 1), and superior non-gassing effectiveness over the magnesium silicate-zinc silicate separator material of the above patent (Test 2), in the presence of the zinc in alkali. Thus, it is noted that the gassing rates for the magnesium silicate-zinc silicate material (C), according to the present invention (Test 3), at the end of 6 hours, 24 hours and 48 hours is only 0.6, 1.5 and 3.5 cc, as compared, for example, to 220, 431 and 559 cc, respectively (Test 1), for the olivine (magnesium silicate-iron silicate) material (A) produced according to the above patent. Note also that the amount of gassing for the magnesium silicate-zinc silicate separator material of the invention (C) at the end of 48 hours, 3.5 cc, as compared to the 5.1 cc for the magnesium silicate-zinc silicate separator material (B) of the patent.

Thus, for practical purposes, it is seen that the magnesium silicate-zinc silicate separator of the present invention not only substantially eliminates gassing when in contact with the zinc, but is superior in this respect to the magnesium-zinc silicate separator material of the above patent. This elimination of gassing of the separator of the invention is clearly indicated by the fact that the zinc blank alone (Test 4) in contact with alkali produced about the same amount of gassing as in the case of the zinc in contact with the magnesium silicate-zinc silicate separator of the invention (Test 3).

EXAMPLE 9

The sintered separator plaques of Example 7 are ground, ball milled and dried. 80 parts by weight of such separator material are mixed into a solution containing, by weight, 10 parts polyphenylene oxide, 10 parts polypropylene polyazelate, marketed as Plastolein 9750 by Emery Industries, Inc., dissolved in approximately 93 parts chloroform. This mixture is ball-milled 16 hours to form a smooth product of paint-like consistency. It is coated on 10 mil-thick fuel cell asbestos sheets, previously dipped in a 2% polyphenylene oxide polymer solution in chloroform and dried. The liquid coating is adjusted to form a dried film about 5 mils thick. The sheets so prepared after drying are now flexible separators suitable for high energy density batteries, and having the substantially non-gassing characteristics in the presence of zinc and alkali, of the magnesium silicate-zinc silicate separators, of the invention, together with high resistance to alkali and long cycle life.

EXAMPLE 10

The sintered magnesium silicate-zinc silicate separator plaques produced in Example 7 are ground and ball milled to fine particle size.

The material is then processed according to Example 1 of above copending application, Ser. No. 27,577, to produce a substantially non-gassing separator in the following manner. An amount of 335 grams of such fine particle size magnesium silicate-zinc silicate is suspended in 225 grams water to form a 60% suspension by weight. An amount of 237.4 grams of Du Pont T-30B TFE aqueous emulsion of polytetrafluoroethylene (60.4% solids content) is added slowly to the magnesium silicate-zinc silicate dispersion.

After about 20 to 30 minutes of stirring, the resulting homogeneous slurry or aqueous dispersion is poured on a pyrex glass plate, and is drawn down by means of doctor blade set at 0.038 cm (15 mils). The resulting film is dried initially for about 15 minutes in the draft of a laboratory hood at about 70° F, and further dried at ambient room temperature for 15 hours. The dried film is then sintered at 360° C for 20 minutes. About 12 grams of glycerine is added to the slurry prior to casting, per 100 ml of such mixture, to improve film properties and prevent cracking during the following sintering operation.

The resulting sintered film formed of about 70% magnesium silicate-zinc silicate and about 30% polytetrafluoroethylene, is highly flexible, has uniform distribution of the inorganic particles, and has high stability in aqueous KOH solution at 50° to 100° C.

EXAMPLE 11

Referring to the accompanying illustrative drawing, the separators produced according to Example 3 are assembled in a three electrode battery of the type indicated at 10, each consisting of two silver electrodes 12 and one zinc electrode 14, with the zinc electrode sandwiched between two of the magnesium silicate-zinc silicate separators 16 produced according to Example 3 above, one separator opposite each face of the zinc electrode, such separators contacting the adjacent silver electrodes. The two silver electrodes are connected via leads 18 to a battery terminal 20, and the zinc electrode is connected via a lead 22 to the battery terminal 24. The battery is filled with 30% KOH.

Three separate batteries having the above described construction are provided, and are tested at ambient temperature using a cycling regime of one hour discharge and three hours charge per cycle. The batteries or cells have a 1.1 amperehour nominal original capacity. Discharge of the cells is to 50% depth of discharge and recharge is to a maximum voltage of 2.09 volts per cell. Usually about 3 to about 5% overcharge is supplied to the cells.

Using the above noted cycling regime, one of the above described batteries employing the magnesium silicate-zinc silicate separators of Example 3, operates for 843 cycles, a second of such batteries for 987 cycles, and a third for 901 cycles, with substantially no gassing in any of these batteries, and no signs of deterioration or weakening of the separators at the end of the above cycling periods.

Magnesium silicate-zinc silicate separators produced according to Example 1 of above patent 3,446,668 and containing just under 40 mol percent magnesium silicate, and in excess of 60 mol percent zinc silicate, tested in the same types of three electrode cells described above, and under the same cycling conditions result in an average of about 200 cycles under these rigorous cycling conditions involving discharge to 50% depth of discharge, at which time significant dissolution of the separators in the alkali is evident, resulting in reduced modulus of rupture and reduced efficiency.

EXAMPLE 12

A battery of the type described in Example 11 and containing the magnesium silicate-zinc silicate separators of Example 3 of the invention above and the same battery employing the magnesium silicate-zinc silicate separators of Example 1 of the above patent are subjected to heat sterilization at temperature of 135° C for 200 hours. The battery containing the separators of Example 3 hereof remain operative and efficient with substantially no degradation of such separators at the end of the heat sterilization period, whereas the battery containing the separators of Example 1 of the above patent are less efficient, with significant dissolution of the separators taking place over this sterilization period.

Although the improved magnesium silicate-zinc silicate separators produced according to the invention are particularly advantageous when employed with a zinc electrode to markedly reduce or substantially eliminate gassing tendency, it will be noted that the improved separators of the present invention can also be utilized in high energy density batteries containing electrodes other than zinc electrodes, for example, in a nickel-cadmium or silver-cadmium battery, with advantageous results in providing reduction of dendrite growth on prolonged cycling.

In view of the foregoing, it is seen that the invention provides procedure for producing substantially non-gassing high alkali resistant efficient separators, particularly when employed with a zinc electrode, permitting the provision of hermetically sealed alkaline secondary batteries, such as efficient sealed siver-zinc and silver-cadmium batteries able to withstand rigorous cycling regimes to a 50% and lower depth of discharge over a large number of charge-discharge cycles both at ambient and elevated temperature. In addition, the magensium silicate-zinc silicate separators of the invention have high transverse strength, low resistivity, and inhibiting effect on zinc dendrite formation.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. A substantially non-gassing high alkali resistant battery separator when employed with a zinc electrode, and having low resistivity, and inhibiting effect on zinc dendrite formation, in the form of a porous member consisting essentially os sintered particles of a single phase solid solution of about 60 to about 99 mol percent magnesium silicate and about 1 to about 40 mol percent zinc silicate.

2. A battery separator as defined in claim 1, said solid solution consisting essentially of about 75 to about 95 mol percent magnesium silicate and about 5 to about 25 mol percent zinc silicate, said separator having a porosity corresponding to a water absorption ranging from about 5% to about 50%.

3. A battery separator as defined in claim 1, said separator having a modulus of rupture ranging from about 8,000 to about 18,000 psi, and a resistivity ranging from about 5 to about 50 ohm-cm.

4. A flexible battery separator as defined in claim 1, said sintered composition in particulate form being distributed uniformly in a polymeric organic binder.

5. A flexible battery separator as defined in claim 2, said sintered composition in particulate form being distributed uniformly in a polymeric binder selected from the group consisting of polyphenylene oxide and polytetrafluoroethylene.

6. In a battery containing a zinc electrode, a substantially non-gassing battery separator as defined in claim 1. of a porous member comprising a sintered composition of magnesium silicate and zinc silicate, said composition containing not less than about 60 mol percent magnesium silicate and not more than about 40 mol percent zinc silicate.

7. In a battery as defined in claim 6, said solid solution consisting essentially of about 75 to about 95 mol per cent magnesium silicate and about 5 to about 75 mol per cent zinc silicate, said separator having a porosity corresponding to a water absorption ranging from about 5% to about 50%.

8. In a battery as defined in claim 6, said zinc electrode being positioned on one side of said separator and including a silver electrode positioned on the opposite side of said separator.

* * * * *

UNITED STATES PATENT OFFICE
CERTIFICATE OF CORRECTION

PATENT NO. : 4,052,540

DATED : October 4, 1977

INVENTOR(S) : Joseph S. Smatko

It is certified that error appears in the above-identified patent and that said Letters Patent are hereby corrected as shown below:

Column 15 line 11 after the numeral 1. delete "of a porous member comprising a sintered composi-"

Column 15 lines 12 and 13 delete "tion of magnesium silicate and zinc silicate, said composition containing not less than about 60 mol percent"

Column 16 lines 1 and 2 delete "magnesium silicate and not more than about 40 mol percent zinc silicate."

Signed and Sealed this

Fifteenth Day of August 1978

[SEAL]

Attest:

RUTH C. MASON
Attesting Officer

DONALD W. BANNER
Commissioner of Patents and Trademarks